(12) United States Patent
Dymond

(10) Patent No.: US 11,995,176 B2
(45) Date of Patent: May 28, 2024

(54) PLATFORM FOR GENERATION OF PASSWORDS AND/OR EMAIL ADDRESSES

(71) Applicant: PHANTOMKEY TECHNOLOGY LIMITED, Eastleigh (GB)

(72) Inventor: Michael Hugh Thomas Dymond, Pewsey (GB)

(73) Assignee: PHANTOMKEY TECHNOLOGY LIMITED, Eastleigh (GB)

( * ) Notice: Subject to any disclaimer, the term of this patent is extended or adjusted under 35 U.S.C. 154(b) by 286 days.

(21) Appl. No.: 17/344,389

(22) Filed: Jun. 10, 2021

(65) Prior Publication Data

US 2021/0342438 A1 Nov. 4, 2021

Related U.S. Application Data

(63) Continuation of application No. 15/569,819, filed as application No. PCT/GB2016/051133 on Apr. 22, 2016, now Pat. No. 11,062,018.

(30) Foreign Application Priority Data

Apr. 30, 2015 (GB) ..................................... 1507436

(51) Int. Cl.
*H04L 9/00* (2022.01)
*G06F 21/41* (2013.01)
(Continued)

(52) U.S. Cl.
CPC .............. *G06F 21/46* (2013.01); *G06F 21/41* (2013.01); *H04L 9/0643* (2013.01);
(Continued)

(58) Field of Classification Search
CPC ... H04L 9/3228; H04L 9/0863; H04L 9/0861; H04L 9/0643; H04L 51/42; G06F 21/41; G06F 21/46
(Continued)

(56) References Cited

U.S. PATENT DOCUMENTS 9,742,722 B2 * 8/2017 Ticó ........................ H04L 51/23
10,507,795 B1 12/2019 Schubert
(Continued)

FOREIGN PATENT DOCUMENTS

JP 2008276657 * 11/2008 ............. G06F 13/00

*Primary Examiner* — Josnel Jeudy
(74) *Attorney, Agent, or Firm* — Leason Ellis LLP

(57) ABSTRACT

A password and/or email address management platform configured to regenerate a previously generated password for a given web domain or digital system without permanently storing the previously generated password. The platform can operate without maintaining a permanent store or list of other user-related information, e.g. a list of web domains or systems for which passwords have been generated. In an embodiment, the platform performs the steps of concatenating a plurality of password input data elements into a requested phantom password input data string, applying a hashing algorithm to the requested phantom password input data string to generate a phantom password hash, applying a hash-to-string function to convert the phantom password hash to a phantom password, and purging the password generation system of the phantom password after it is notified to a user.

7 Claims, 11 Drawing Sheets

(51) Int. Cl.
  *G06F 21/46* (2013.01)
  *H04L 9/06* (2006.01)
  *H04L 9/08* (2006.01)
  *H04L 9/32* (2006.01)
  *H04L 51/42* (2022.01)
(52) U.S. Cl.
  CPC .......... *H04L 9/0861* (2013.01); *H04L 9/0863* (2013.01); *H04L 9/3228* (2013.01); *H04L 51/42* (2022.05)
(58) Field of Classification Search
  USPC ....................................................... 713/184
  See application file for complete search history.

(56) References Cited

U.S. PATENT DOCUMENTS

| | | | |
|---|---|---|---|
| 2002/0122543 A1* | 9/2002 | Rowen | G06F 16/2272 |
| | | | 379/93.01 |
| 2002/0144128 A1 | 10/2002 | Rahman et al. | |
| 2003/0131266 A1 | 7/2003 | Best et al. | |
| 2003/0226040 A1 | 12/2003 | Challener et al. | |
| 2004/0025026 A1 | 2/2004 | Karp et al. | |
| 2004/0068542 A1* | 4/2004 | Lalonde | G06Q 10/107 |
| | | | 713/160 |
| 2007/0192617 A1 | 8/2007 | Brickell | |
| 2007/0256118 A1 | 11/2007 | Nomura et al. | |
| 2009/0320109 A1 | 12/2009 | Salada et al. | |
| 2010/0057866 A1 | 3/2010 | Bauchot et al. | |
| 2010/0186070 A1 | 7/2010 | McAlear | |
| 2010/0218241 A1 | 8/2010 | Faryna | |
| 2010/0250632 A1 | 9/2010 | Uno | |
| 2011/0208592 A1* | 8/2011 | Golder | G06Q 30/0269 |
| | | | 705/14.66 |
| 2011/0296509 A1 | 12/2011 | Todorov | |
| 2013/0007869 A1 | 1/2013 | Thomas | |
| 2014/0032922 A1 | 1/2014 | Spilman | |
| 2015/0026274 A1* | 1/2015 | Chen | H04L 51/214 |
| | | | 709/206 |
| 2015/135291 A1 | 3/2015 | Yang et al. | |
| 2015/0095162 A1* | 4/2015 | Jakobson | G06Q 30/0269 |
| | | | 705/14.66 |
| 2015/0134956 A1 | 5/2015 | Stachura et al. | |
| 2016/0110775 A1 | 4/2016 | Moiz | |
| 2019/0182042 A1 | 6/2019 | Ebrahimi et al. | |
| 2020/0278934 A1* | 9/2020 | Hillier | G06F 16/90344 |

* cited by examiner

PLATFORM FOR GENERATION OF PASSWORDS AND/OR EMAIL ADDRESSES

CROSS-REFERENCE TO RELATED APPLICATIONS

This application is a continuation of U.S. application Ser. No. 15/569,819, filed Nov. 27, 2017 which is a U.S. National Stage Application under 35 U.S.C. § 371 of International Patent Application No. PCT/GB2016/051133, filed Apr. 22, 2016, which claims priority to Great Britain Application No. 1507436.2, filed Apr. 30, 2015, which are hereby incorporated by reference in their respective entireties.

FIELD OF THE INVENTION

The invention relates to a computer-based platform arranged to permit a computer user to manage their digital security. In particular, the invention relates to a password management system for assisting a computer user in generating and recalling passwords and, optionally, email addresses utilised for login purposes, e.g. to online services or digital resources on a network or local machine.

BACKGROUND TO THE INVENTION

It is now common for digital security to be used to restrict access to certain computer-based content or services. For example, it is well known for computer users to have to authenticate themselves, e.g. using a username and password combination, in order to be granted permission to access online services or digital resources on a network or offline system.

A single computer user may need to perform many authentication operations. For example, users of the world wide web may wish to access a plurality of online services thereon, e.g. web-based email, internet banking, social media, internet shopping, remote access to business networks, etc. Many online services require a user to have a registered user account. To access services using a registered user account, a user typically has to authenticate themselves using a username and password combination.

As secured digital resources (both online and offline) continue to proliferate, any given user may have a large number of accounts and hence a large number of username and password combinations. On the one hand it is difficult for users to remember many different combinations, but on the other hand it is well known that using the same username/password combination for multiple services is less secure.

To solve this problem, it is known to provide password management tools, which assist a user in recalling username/password combinations. For example, US 2013/0254856 discloses a password generation and management system which stores a plurality of unique secure random passwords associated with each of a plurality of online accounts for managing access to each of the online accounts.

SUMMARY OF THE INVENTION

At its most general, the present invention provides a user password management platform that can regenerate (i.e. generating for a second or subsequent time) a previously generated password for a given web domain or digital system without permanently storing the previously generated password. Current password management tools operate by storing, usually using very strong encryption techniques, the passwords for a given user in conjunction with the web domains or system keys for which they are used. Such password stores in themselves are targets for attack. The present invention operates without creating such a store, and hence is less reliant on the strength of encryption than other password management systems. Moreover, the present invention may also operate without maintaining a permanent store or list of other user-related information, e.g. a list of web domains or systems for which passwords have been generated. Such user-related information in itself may be a target for attack, as it can contain commercially valuable information.

According to the invention, there may be provided a method of generating a phantom password for authenticating a user on a digital (i.e. computer-based) system (e.g. a website or offline system or computer network), the method comprising: receiving in a phantom password generation system from a client device a request for generation or regeneration of a phantom password for a digital resource (e.g. website or off-line system or device); in the phantom password generation system: concatenating a plurality of password input data elements into a requested phantom password input data string; applying a hashing algorithm to the requested password input data string to generate a phantom password hash; applying a hash-to-string function to convert the phantom password hash to a phantom password; notifying the remote client device of the phantom password; and purging the password generation system of the phantom password. The digital resource may have a unique identifier, such as a web domain or system key. The same method may be used for generating a password for a new domain or new system key, or for regeneration of a previously generated password for a given web domain or system key. Where this document refers to a domain/key, it is to be understood to refer to either a web domain or a system key, to reflect the fact that the invention may be used for online services (i.e. associated with a web domain) or for offline services (i.e. associated with a digital system having a key or other identifier).

The system does not store an encrypted version of the phantom password. Instead it is capable of performing repeatable assembly of an input data string for a hashing algorithm, where the resulting hash is transformed to a string that represents the requested phantom password. The input data string is assembled by concatenating a plurality of input elements. The identity of those elements and the order of concatenation may be used to provide security to the resulting phantom password.

In particular, the method of assembling the input data string may not be predicted or otherwise determined from knowledge of elements that are stored in the system. For example, the phantom password generation system may include a system database arranged to store, among other things, a stored user password hash and a reference code (referred to herein as a randomizer) for each user. The randomizer may be a randomly ordered string of different characters, such as a 10-digit number in which the digits 0 to 9 are ordered at random.

The plurality of password input data elements may be concatenated in an order selected based on the user's randomizer. For example, the input data elements may be ordered based on one or a string of predetermined characters in the randomizer, i.e. a portion or subset of the randomizer. This character or string of characters differs from user to user, and hence the order of concatenation varies from user to user.

The plurality of password input data elements may comprise: a username for the user stored in the system database; an internal salt selected from a list based on a first predetermined character of the user's randomizer; and a domain/key representative of the web domain or system key. The internal salt may vary from user to user, yet does not require that any member of a list of internal salts is associated with a user in any way. Herein the term "internal salt" is used to mean a salt that is part of the software that implements the method, e.g. stored in the source code of the application. Additional input data elements may be used to further strengthen the security of the input data string. For example, the input data elements may include a stored password salt that is specific to the user or a machine salt that is specific to the device (e.g. server) which runs the software. The stored password salt may be stored in the database, whereas the machine salt may be stored on the server itself, e.g. in a dedicated file or in a config setting.

In order to use the system, the user may need to log in. The method therefore may include, before receiving the request for generation or regeneration of a phantom password for a domain/key, logging in the user to the password generation system, wherein the logging in step may include: receiving a user password from the user; concatenating a plurality of login input data elements including the user password into a login input data string; applying a hashing algorithm to the login input data string to generate a login user password hash; and matching the login user password hash with a stored user password hash already stored in the system database. Thus, the stored user's login credentials may be dtsguised in a similar way to the requested passwords.

The plurality of login input data elements may comprise: a username for the user stored in the system database; the user password; and an internal salt selected from a list based on a second predetermined character of the user's randomizer. The plurality of login input data elements may be concatenated in an order selected based on the user's randomizer. The plurality of login input data elements may also include a stored password salt and a machine salt.

The system may use the stored user password hash solely for authentication purposes. However, in order to improve the security of the generated phantom passwords, the method may utilise information relating to the user's login credentials in the generation of the phantom password. Accordingly, the method may include, after successfully matching the login user password hash with a stored user password hash stored in the system database: concatenating a plurality of session input data elements including the user password into a session input data string; applying a hashing algorithm to the session input data string to generate a session user password hash; and storing the session user password hash in the current session with the phantom password generation system, wherein the session user password hash is different from the stored user password hash stored in the system database. The session user password hash may then be used as an input data element, e.g. in the plurality of password input data elements, etc.

The plurality of session input data elements may comprise: a username for the user stored in the system database; the input system password; and an internal salt selected from a list based on a third predetermined character of the user's randomizer. The first, second and third predetermined characters may all be different from one another. The plurality of session input data elements may also include a stored password salt and a machine salt.

The plurality of session input data elements may be concatenated in an order selected based on the user's randomizer.

For addition security, the method may require the user to perform dual factor authentication, e.g. upon login or with each new phantom password request. The method may therefore include, after receiving the request for generation or regeneration of a phantom password for a domain/key, performing dual factor authentication by sending an SMS code to an SMS-enabled device associated with the user.

In another aspect, the present invention may provide a method of generating a phantom email address, e.g. for a user to use to communicate with a given web domain or digital system, the method comprising: receiving in a phantom email address generation system from a client device a request for generation or regeneration of a phantom email address for use with a certain domain/key; in the phantom email address generation system: concatenating a plurality of email address input data elements into a requested email address input data string; applying a hashing algorithm to the requested email address input data string to generate a phantom email address hash; applying a hash-to-string function to convert the phantom email address hash to a local part of an email address; appending a domain part to the local part to form a complete email address; notifying the remote client device of the complete email address; and purging the phantom email address generation system of the local part of the email address.

This aspect may be provided in combination with the generation of a phantom password as described above. The result may be a phantom email address and phantom password combination for use with a given web domain or system key. Features discussed above with respect to the generation of a phantom password may be applicable to the generation of a phantom email address.

For example, the phantom email address generation system may include a system database arranged to store a system email address and a randomizer for each user. The randomizer may be the same as described above, and used for similar purposes.

The plurality of email address input data elements may comprise: the username stored for the user; a domain/key; and an internal salt selected from a list based on a fourth predetermined character of the user's randomizer. The plurality of email address input data elements may also include a stored password salt and a machine salt. In this example, a session user password hash may not be used as an input data element, since any change to the user's password would cause a regenerated phantom email address to change.

The plurality of email address input data elements may be concatenated in an order selected based on the user's randomizer.

The method may include generating a stored email address hash for storage in the system database. The method may include checking that the generated stored email address hash does not already exist on the system database in order to ensure that the complete email address is not already in use in the system.

The process of generating the stored email address hash may comprise: concatenating a plurality of email address reference input elements into a stored email address input data string; and applying a hashing algorithm to the stored email address input data string, wherein the plurality of email address reference input elements may comprise: the complete email address, and an internal salt selected from a predetermined list of internal salts based on a characteristic of the complete email address, e.g. the first letter of the complete email address. The plurality of email address reference input data elements may also include a stored password salt and a machine salt.

The method may also include generating a domain/key hash for storage in the system database as an identifier for the web domain or system key. This can be used to keep a tally on the number of web domains or systems for which a user has requested a phantom password. Moreover, if the system is arranged to receive incoming emails sent to the complete email address, the domain/key hash can be used as a reference to determine appropriate handling of each incoming email without revealing any link between a user and any given web domain or digital system.

Generating the domain/key hash may comprise: concatenating a plurality of domain/key input elements into a domain/key input data string; and applying a hashing algorithm to the domain/key input data string, wherein the plurality of domain/key input elements may comprise: the complete email address; a web domain or system key; and an internal salt selected from a list based on a fifth predetermined character of the user's randomizer. The plurality of domain/key input elements may also include a stored password salt and a machine salt.

The plurality of domain/key input data elements may be concatenated in an order selected based on the user's randomizer.

The method of the invention may be implemented via software running on a suitable programmed processor, e.g. on a server with which user computing device can communication via a network, e.g. the world wide web. In one example, the software may run as a web browser plugin.

BRIEF DESCRIPTIONS OF THE DRAWINGS

Examples of the present invention are discussed in detail below with reference to the accompanying drawings, in which.

DETAILED DESCRIPTION; FURTHER OPTIONS AND PREFERENCES

In one embodiment, the present invention provides an online phantom password and phantom email address generation and regeneration system which users can access to provide login information for a plurality of web domains with which they hold accounts. The system of the invention may be cloud-based, i.e. a web-based platform accessible from any web-enabled computing device. References herein to a "device" or "server" executing operations of the system may therefore be understood to encompass references to a virtual device or virtual server that may be operating in the cloud. For example, the system may be built using Microsoft®'s .Net framework and hosted in Microsoft®'s Azure® cloud platform. Although this embodiment discusses use of the invention in an online system, it can be understood that it is applicable to any digital system that requires user authentication, e.g. off-line networks or other digital resources.

At a general level, the system operates to return, upon request from an authenticated user within a valid session, phantom login information (e.g. a phantom email address and phantom password combination in this embodiment) for a given web domain. In this embodiment, the system returns a phantom email address, which may or may not be used as a username on the account. In other embodiments, the system may be arranged to return a phantom username and phantom password combination. For web domains that are new to a user, the system can generate new phantom login information. For web domains for which the system has previously generated login information, the phantom email address and phantom password combination are regenerated. However, in both scenarios, the phantom login information is purged from the system after it is transferred to the user. There is no permanent storage of a user's phantom login information for any given web domain. Instead the system operates by using a repeatable schema for the generation of the phantom login information, which thus enables the same phantom login information for a given web domain to be returned to any given user. To render the repeatable schema secure, several techniques are used to prevent reverse engineering, as explained in more detail below.

Various processes of the system are now discussed in detail.

Figure 1A:
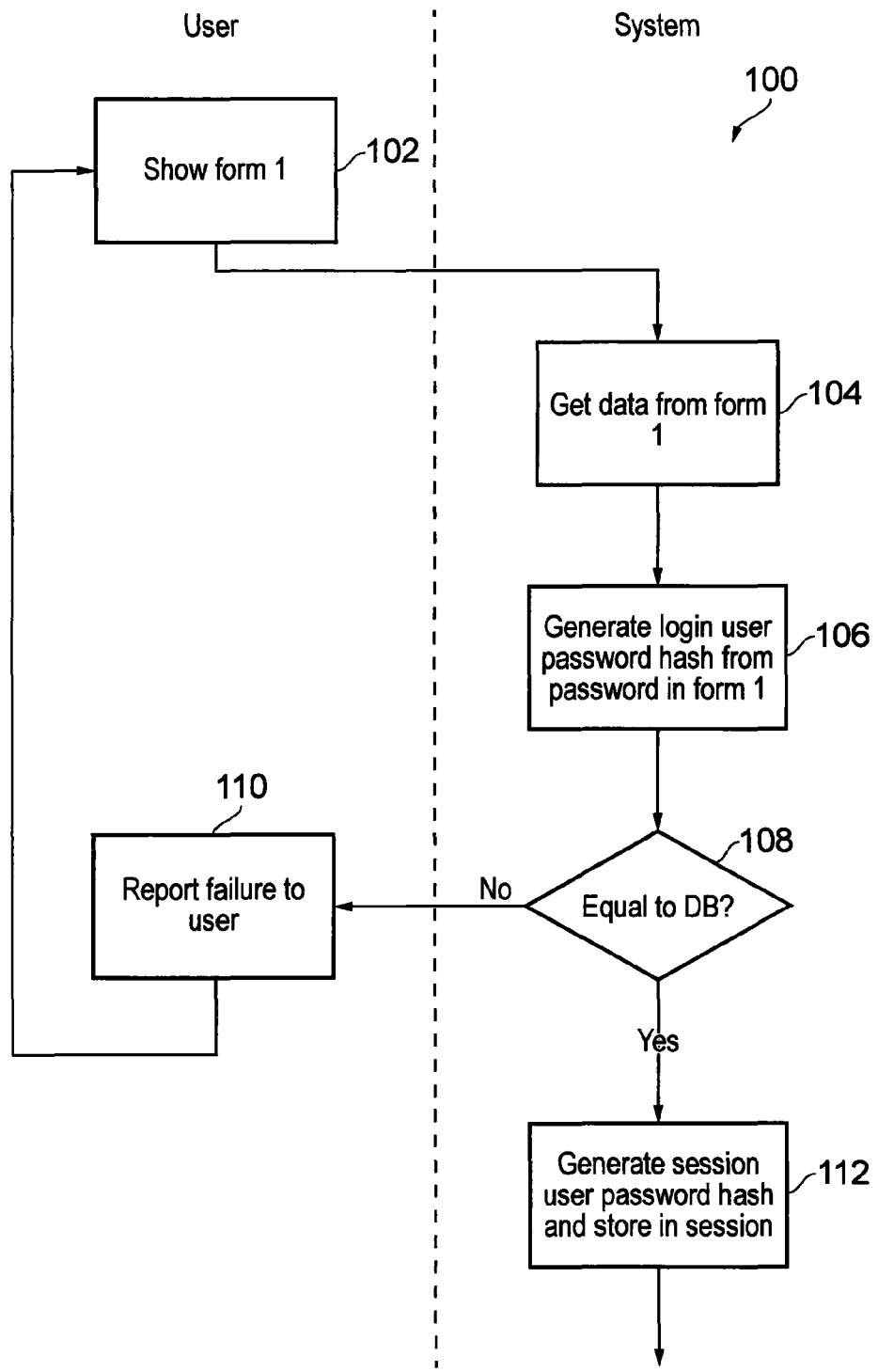
FIGS. 1A and 1B show a flow chart for a login process in a system that is an embodiment of the invention.
Figure 1B:
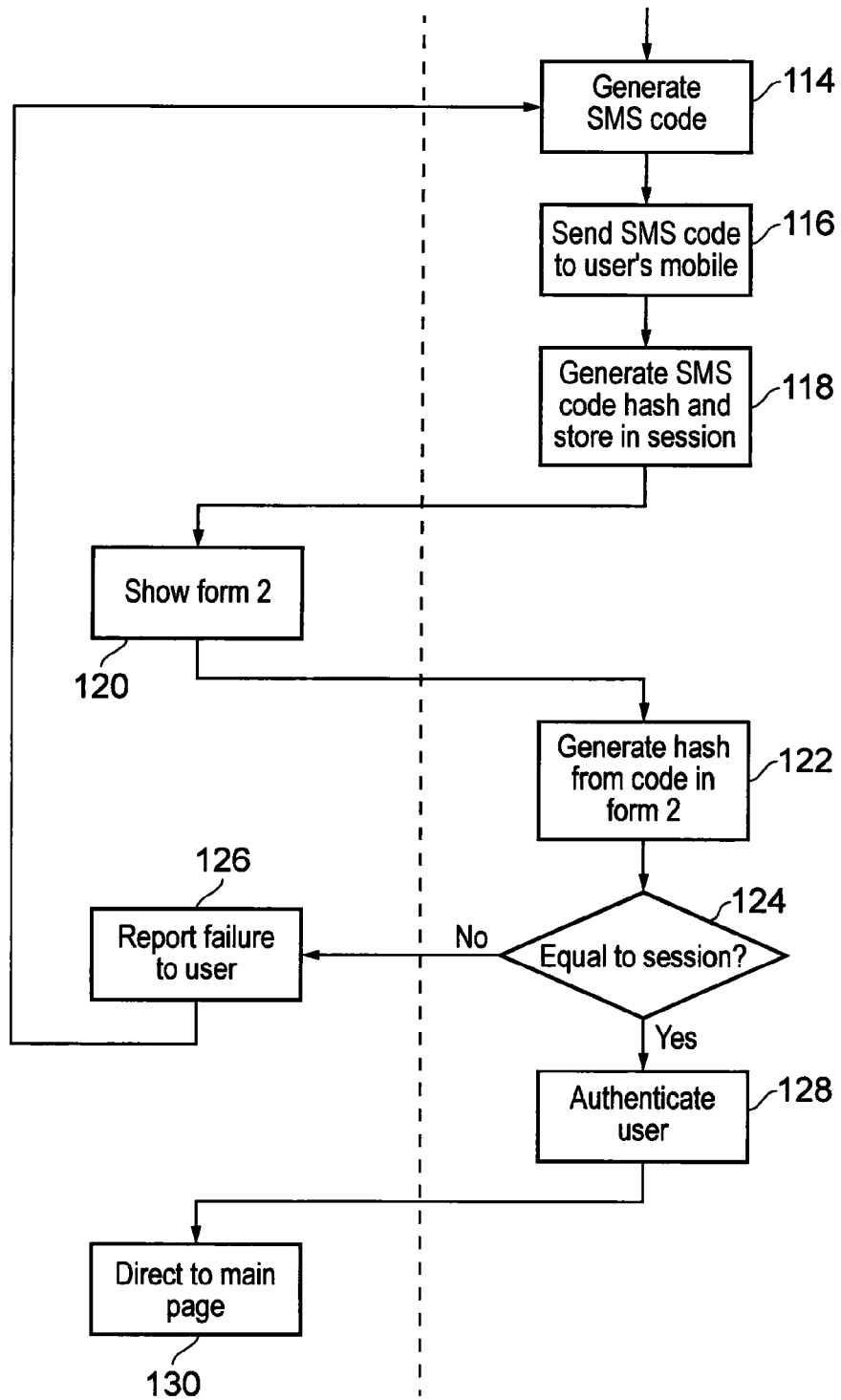

FIGS. 1A and 1B show a flow chart for a login process 100 for the system of the invention. In this embodiment, a two factor authentication process is used to log a user into the system. In one embodiment, the asp.net identity framework may be used to implement the two factor authentication process.

Upon receipt of a login request or when a login webpage of the system is accessed, the login process begins with a step 102 of showing a first login form to the user. The first login form requests the user to enter a unique username and a password. The process continues with a step 104 of returning data entered in the first login form into the system. The process continues with a step 106 of generating a login user password hash using, among other things, data entered on the first login form. The process of generating the hashes discussed herein is described in more detail below. The login user password hash is used solely for user authentication.

The login process continues with a step 108 of comparing the login user password hash with the stored user password hash stored in a system database against the relevant username. If there is no match, the process continues with a step 110 of reporting login failure to the user. As is conventional, the system may be arranged to lock a user's account if the wrong password is entered more than a preset number of times. Similarly, the system may be arranged to detect and inhibit systematic (e.g. automated) attempts to guess username/password combinations.

If there is a match, the process continues with a step 112 of creating a session user password hash using, among other things, data entered on the first login form. The session user password hash is created using a different technique from the login user password hash as discussed below. The session user password hash is stored as part of the user's current session, and is used in the generation or regeneration of phantom passwords as discussed below.

Meanwhile, as shown in FIG. 1B, the login process continues with a step 114 of generating an SMS code, followed by a step 116 of forwarding the generated SMS code to SMS-enabled device (e.g. smartphone, cell phone or the like) that is associated with the user. The system database may include an identifier (e.g. telephone number) for the user's SMS-enabled device. The SMS code may be a randomly generated alphanumeric string, and varies between different sessions for the same user.

The process continues in the system with a step 118 of generating a SMS code hash using, among other things, the generating SMS code. The SMS code hash is stored as part of the user's current session. The SMS code hash may be time limited, e.g. by having a time stamp or expiry associated with it. For example, the SMS code hash have a time limit of one hour.

The process continues with a step 120 of showing a second login form to the user. The second login form requests the user to enter the SMS code received on their SMS-enabled device. Upon receipt of data entered into the second login form, the process continues with a step 122 of creating a returned SMS code hash using, among other things, data entered on the second login form. The process continues with a step 124 of comparing the returned SMS code hash with the stored SMS code hash in the session. If there is no match or the SMS code hash has expired, the process continues with a step 126 of reporting login failure to the user, and, optionally, returning to step 114 to generate a new SMS code. The system may be arranged to detect and inhibit systematic (e.g. automated) attempts to guess SMS code.

If there is a match, the process continues with a step 128 of authenticating the user, whereby access to the system is granted in a step 130 of directing the user to the main page of the system, where they may request a phantom password and/or phantom email address for a given web domain as described below.

The generation and regeneration of phantom passwords in the present invention utilises a plurality of data inputs. The plurality of data inputs are either associated with or derivable from data stored in association with the user. The system does not store any data that represents an encrypted or transformed version of a phantom password. Instead, the system effectively stores the ingredients used for repeatable generation of a phantom password. The form of the ingredients and the manner in which they are mixed are variable from phantom password to phantom password. Thus, even if the data stored for a user became known, their phantom passwords for a given domain/key could not be determined without knowledge of the recipe for generating the phantom password.

Figure 2A:
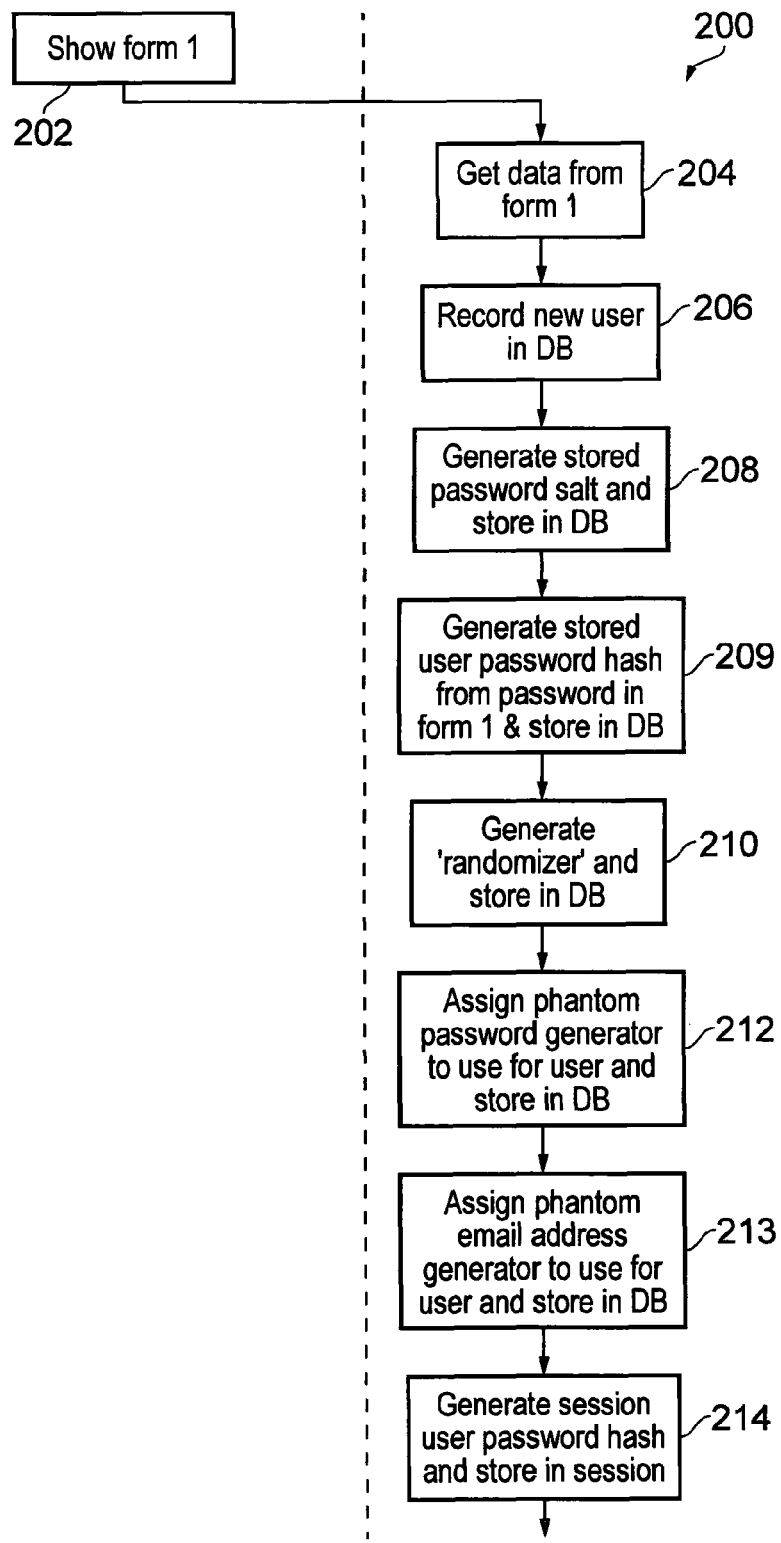
FIGS. 2A and 2B show a flow chart for a new user registration process in a system that is an embodiment of the invention.
Figure 2B:
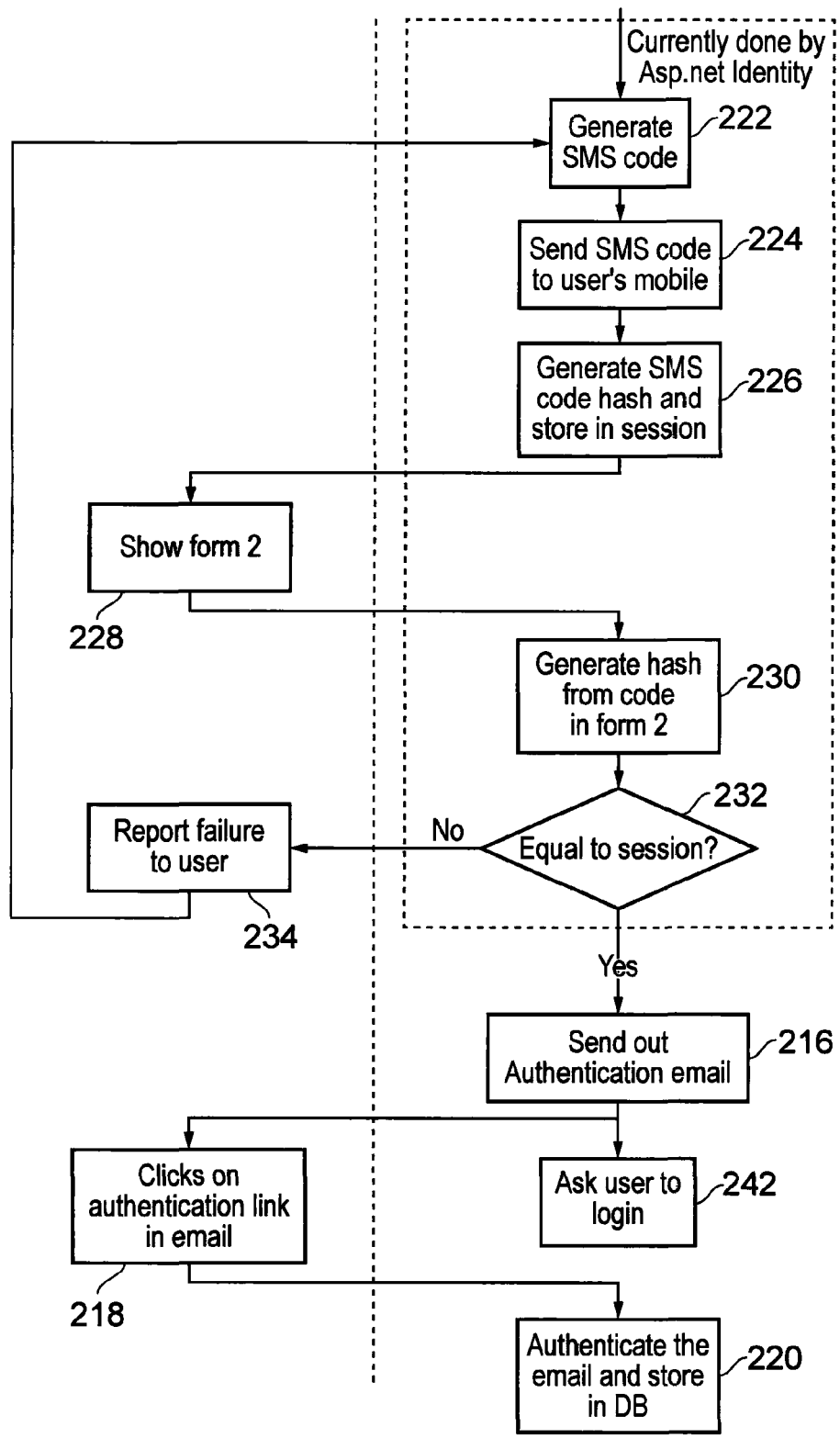

Some of the plurality of data inputs used for generating phantom passwords are determined upon registration of a new user. FIGS. 2A and 2B are a flow chart showing an example of a simple registration process 200. The illustrated registration process is simple because it does not include any commercialisation steps, e.g. requiring the user to pay to use the system. Such steps are conventional, and may be added to the process without necessarily changing the fundamental principles.

The registration process 200 shown in FIGS. 2A and 2B begins with a step 202 of showing a first registration form to the user. The first registration form may be similar to the first login form mentioned above, and requests the user to enter a unique username and a password. It may also include a "confirm password" field to reduce errors, as is conventional. The system may be arranged to request an email address as the username, and this email address is used both as a means of contacting the user and as a unique identifier. Preferably, however, the user is permitted to choose a username, the first registration form may also require that they enter an email address. Preferably the system is arranged to perform two factor authentication on subsequent logins, as discussed above. The first registration form may thus also request contact details for an SMS-enabled device, e.g. a telephone number.

It is desirable for the password entered on the first registration form to be very strong. It is therefore preferable for the system to provide client side enforcement, or at least notification, of very strong password or passphrase use. The tools for implementing this feature are known.

In one embodiment, the system may be accessible by invitation only, i.e. registration is not open to all. The first registration form may thus include a required data field for an invitation code. The process may continue only if a valid invitation code, i.e. one matching a valid available invitation code stored in the system database, is entered.

The process continues with a step 204 of returning data entered in the first registration form into the system. The process continues with a step 206 of recording a new user in the system database, e.g. in an "unauthenticated new user" state. This includes a step 208 of generating and storing a stored password salt associated with the user on the system database, and a step 209 of creating a stored user password hash using, among other things, data entered on the first registration form. The stored user password hash is stored in the system database, where it is used solely for user authentication.

The process continues with a step 210 of generating a randomizer for the user and storing that code in association with the user in the system database. The randomizer may be a reference number consisting of a randomly ordered string of different characters. For example, the randomizer may be a 10-digit number in which the digits 0 to 9 are ordered at random. The randomizer is used to uniquely select or order other pieces of data, e.g. in the process of generating phantom passwords, as discussed below. Although the randomizer is stored in the database, it does not itself map directly to a phantom password. Thus knowledge of the contents of the database, i.e. the username, stored user password hash, and randomizer, cannot be used to yield a user's password information without further knowledge.

As shown in FIG. 2B, the process continues with a step 212 of assigning a phantom password generator to be used for the user. Herein the term "phantom password" is used to mean a password that is generated for use by a user with a given web domain or system key, but which is purged from the system immediately after notification, i.e. no permanent record of the phantom password is stored in the system database. The process for generating a phantom password, i.e. the steps carried out by a phantom password generator, are discussed below. The system may operate with a plurality of phantom password generators. By assigning a phantom password generator to a user, new phantom password generators may be added without disrupting existing users. The system is therefore scalable.

The process continues with a step 213 of assigning a phantom email address generator to be used for the user. The term "phantom email address" is used herein in a manner similar to "phantom password", but to refer to email address information that is never permanently stored on the system database.

The process continues with a step 214 of creating a session user password hash using, among other things, data entered on the first registration form. The session user password hash is created using a different technique from the stored user password hash as discussed below. The session user password hash is stored as part of the user's current session.

As shown in FIG. 2B, the process then continues with a step 222 of generating an SMS code, followed by a step 224 of forwarding the generated SMS code to the SMS-enabled device (e.g. smartphone, cell phone or the like) identified by the user on the first registration form. The SMS code may be a randomly generated alphanumeric string (e.g. a six digit numeric code).

The process continues in the system with a step 226 of generating an SMS code hash using, among other things, the generating SMS code. The SMS code hash is stored as part of the user's current session. The SMS code hash may be time limited, e.g. by having a time stamp or expiry associated with it. For example, the SMS code hash could have a time limit of one hour.

The process continues with a step 228 of showing a second registration form to the user. The second registration form requests the user to enter the SMS code received on their SMS-enabled device. Upon receipt of data entered into the second login form, the process continues with a step 230 of generating a returned SMS code hash using, among other things, data entered on the second registration form. The process continues with a step 232 of comparing the returned SMS code hash with the stored SMS code hash in the session. If there is no match or the SMS code hash has expired, the process continues with a step 234 of reporting registration failure to the user, and, optionally, returning to step 222 to generate a new SMS code. The system may be arranged to detect and inhibit systematic (e.g. automated) attempts to guess SMS code.

If there is a match, the user can login to and use the system as an unauthenticated user. In order to authenticate the user, which may enable the user to access further functionality, the process continues with a step 216 of sending an authentication email to the address provided on the first registration form. Upon receipt of this email at the user's computer, the user continues the process by performing a step 218 of clicking on the authentication link in the email, which notifies the system of user authentication, as is conventional. The system then proceeds with a step 220 of authenticating the email address and storing it in the system database, e.g. in an "authenticated new user" state. The authentication link may be time limited, e.g. by having a time stamp or expiry associated with it. For example, the authentication link may have a time limit of twenty-four hours. If at step 220 the system determines that the authentication link has timed out, the system may be arranged to provide an option to allow the user to request a new authentication email.

Following authentication of the email address, the system may proceed with a step 242 of requesting the user login, using the process described in FIGS. 1A and 1B above.

Figure 3A:
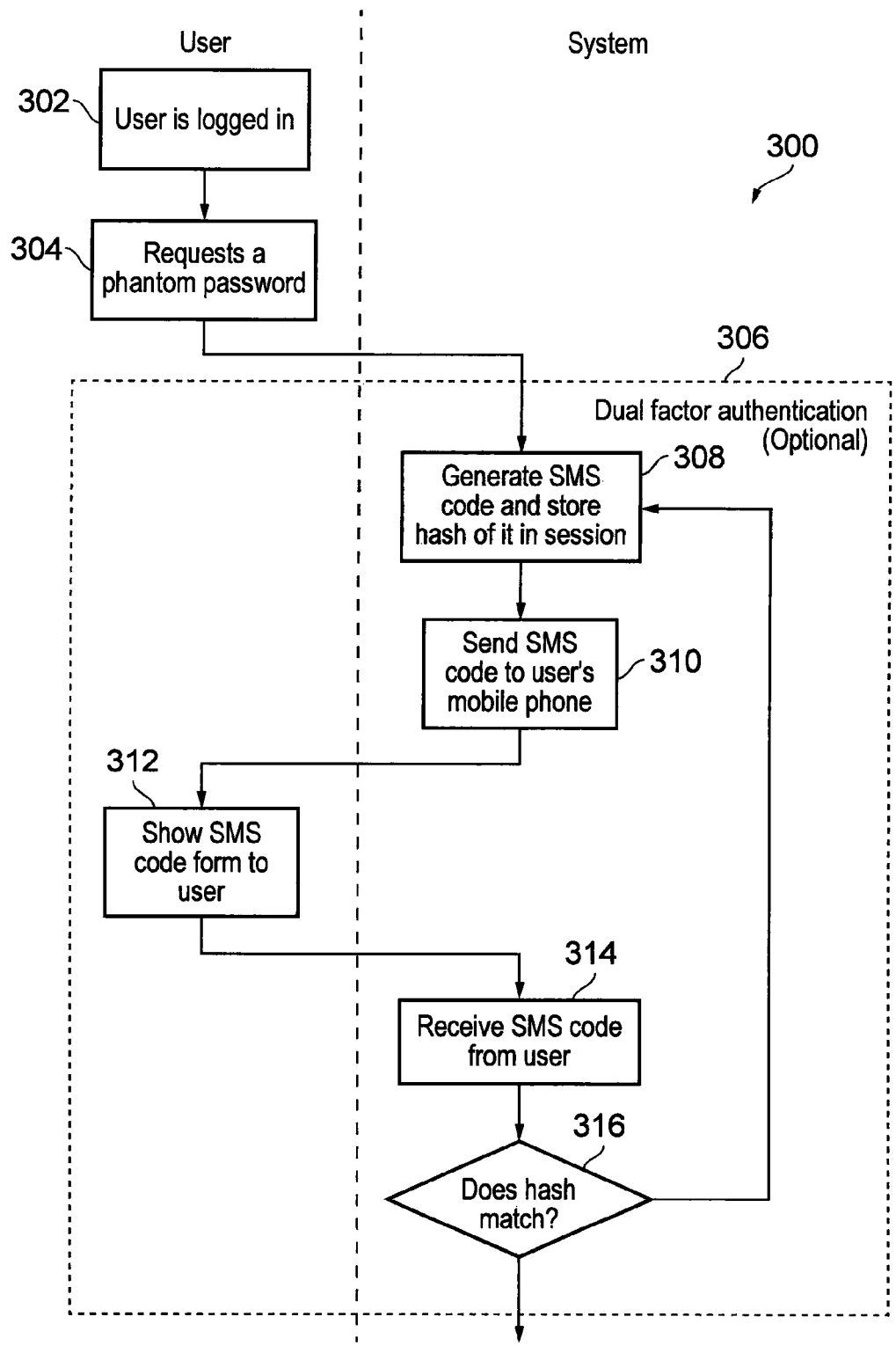
FIGS. 3A and 3B show a flow chart for a password generation/regeneration process in a system that is an embodiment of the invention.
Figure 3B:
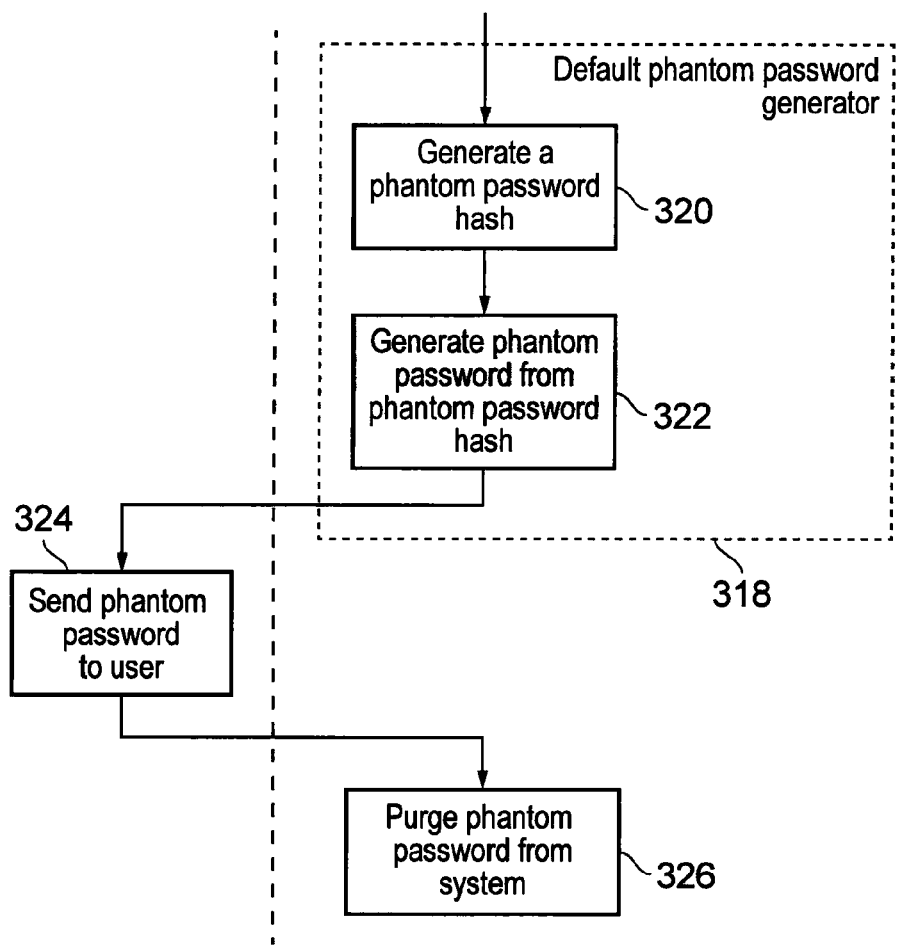

FIGS. 3A and 3B are a flow chart illustrating a process 300 by which a user generates or regenerates a phantom password for a given web domain. The process begins with a step 302 of the user logging in to the system, which is described in detail above. After the user is logged in, the process continues with a step 304 of requesting a phantom password for a given web domain. This step may be carried out by the user entering information into data fields on the main page of the system website. Alternatively, as discussed below, the system may operate as a browser plugin, which may prompt the user to request a password, e.g. by displaying an appropriate pop-up, if it detects that the active webpage requires entry of a username and password. In one example, the user may also enter an independent key (e.g. short data string) together with the web domain. The independent key may be used in conjunction with the web domain (or system key in offline embodiments) to allow the creation of more than one phantom password per domain/key. This may be necessary, e.g. if a system requires passwords to be changed periodically or if the security of a third party database is compromised.

The system may be arranged to apply a dual authentication process 306 to every instance of a phantom password request. However, this stage may be optional. For example, the dual authentication may be activated only in certain circumstances, e.g. a request received from an IP address not associated with the user, or when a password is generated for a web domain for the first time.

If the dual authentication process 306 is activated, the phantom password process continues with a step 308 of generating an SMS code (e.g. a randomly generated alphanumeric string) and generating and storing in the system database a SMS code hash using the generated SMS code. The SMS code hash is stored as part of the user's current session. The SMS code hash may be time limited, e.g. by having a time stamp or expiry associated with it as discussed above.

The process continues in the system with a step 310 of forwarding the generated SMS code to the SMS-enabled device (e.g. smartphone, cell phone or the like) associated with the user.

The process continues with a step 312 of showing an SMS code form to the user. The SMS code form requests the user to enter the SMS code received on their SMS-enabled device. Upon receipt of data entered into the second login form, the process continues with a step 314 of receiving the SMS code from the user and creating a returned SMS code hash using the received SMS code. The process continues with a step 316 of comparing the returned SMS code hash with the stored SMS code hash in the session. If there is no match or the SMS code hash has expired, the process may return to step 308 to generate a new SMS code. The system may be arranged to detect and inhibit systematic (e.g. automated) attempts to guess SMS code. All instances of SMS code processing discussed herein may be handled by the asp.net identity framework.

As shown in FIG. 3B, if there is a match, the process continues with a phantom password generation process 318. The generation (or regeneration) of a phantom password has two stages. The first stage is a step 320 of generating a phantom password hash using a plurality of data inputs. The second stage is a step 322 of extracting a phantom password from the phantom password hash by using a hash-to-string conversion process. The hash-to-string conversion may take account of various password schemas that may be required by certain web sites or other systems, e.g. concerning the length (number of characters) and content (e.g. uppercase, lowercase, numbers, special characters) that may be required. Any conventional hash to string conversion algorithm may be used for this part of the process After the phantom password is generated, the process continues with a step 324 of sending the phantom password to the user. This may involve displaying the phantom password on the user's computer, e.g. in a format suitable for copying and pasting into the relevant fields. If the system operates through a browser plugin, the phantom password may be populated directly into the password field on the webpage.

After the phantom password is provided to the user, the process concludes with a step 326 of purging the phantom password from the system. Herein purging means deleting any information representative of the phantom password from memory and overwriting the relevant area of memory with other information. After this step is complete, there is no record of the phantom password on the system database.

An important aspect of the present invention is the generation of the phantom password hash in step 320. As mentioned above, this is generated by creating an input data string comprising a plurality of data inputs (also referred to as data elements), each of which is a separate data string and all of which are concatenated in a certain order to create the input data string. The phantom password hash is created by applying a hashing algorithm (e.g. PBKDF2 with SHA512) to the input data string.

In one example, the plurality of data inputs used to create a phantom password hash consist of:
 1) the username for the user stored in the system database,
 2) the stored password salt associated with the user,
 3) a machine salt from a file stored on the device (e.g. virtual server in a cloud-based system) that is running the process,
 4) the session user password hash created during the login process,
 5) an internal salt selected from a list within the source code of the software based on a predetermined digit from the user's randomizer,
 6) the domain/key to identify the system for which the phantom password is required, and
 7) if used, the independent key entered by the user.

The code which executes assembly of the input data string is arranged to look at a predetermined digit of the user's randomizer in order to select the internal salt. Thus, if the randomizer is a 10-digit number corresponding to a random order of the digits 0 to 9, the system may store 10 internal salts, each corresponding to one of the digits 0 to 9. In assembling the input data string, the system may be arranged to look at a predetermined digit of the user's randomizer to identify one of the internal salts, which is then used in the input string.

In addition to determining the internal salt, the user's randomizer is also used to determine the order in which the input elements are concatenated to create the input data string. This may be done by using a predetermined selection of characters in the randomizer to determine an order for the input elements. For example, if the randomizer is a 10-digit number corresponding to a random order of the digits 0 to 9, the system may be arranged to use a predetermined set of numbers to determine the order of the input elements. This may be done by creating a list of all of the input elements used in a particular phantom password generator against a respective character from the randomizer. This list may then be sorted according to the values of the randomizer digits, following which each element in the new sorted list is output in order to build the input string.

The discussion above concerns creating an input data string for generating a phantom password hash. Similar processes are used to create the stored user password hash (and therefore the login user password hash), the session user password hash and the SMS code hash discussed above.

The stored user password hash and login user password hash, i.e. the user password hash that is stored in the system database and is used for authentication, is generated by applying a hashing algorithm (e.g. PBKDF2 with SHA512) to an input data string that is assembled for this purpose. The input data string for the stored user password hash is different from the input data string used for phantom password generation, and may consist of:
 1) the username stored for the user in the system database,
 2) the stored password salt stored in association with the user,
 3) a machine salt from a file stored on the device (server) that is running the process,
 4) the password entered on the first login form (or the first registration form), and
 5) an internal salt selected from a list within the source code of the software based on a predetermined digit from the user's randomizer.

The process for selecting the internal salt may be as described above, although the predetermined digit or character used may be different from that which is used in the generation of the input data string for generating a phantom password hash.

The user's randomizer is also used in this process to determine the order in which the input elements are concatenated to create the input data string. This may be done by using a predetermined selection of five characters in the randomizer to determine an order for the five input elements. For example, if the randomizer is a 10-digit number corresponding to a random order of the digits 0 to 9, the system may be arranged to use a set of five numbers to determine the order of the input elements.

The session user password hash may be generated in the same way as the stored user password hash, except that the predetermined digit for selecting the internal salt and the digits used to determine the order of the input elements may be different.

The SMS code hash may also be generated in a similar way to the stored user password hash. The input data string for the SMS code hash is different from the input data string used in the generation of other hashes, and may consist of:
 1) the SMS code,
 2) the username stored for the user in the system database,
 3) the stored password salt stored in association with the user,
 4) a machine salt from a file stored on the device (server) that is running the process, and
 5) an internal salt selected from a list within the source code of the software based on a predetermined digit from the user's randomizer.

The process for selecting the internal salt may be as described above, although the predetermined digit or character used may be different from that which is used in the generation of the input data string for generating a phantom password hash (or any other hash).

The user's randomizer is also used in this process to determine the order in which the input elements are concatenated to create the input data string. This may be done by using a predetermined selection of five characters in the randomizer to determine an order for the five input elements. For example, if the randomizer is a 10-digit number corresponding to a random order of the digits 0 to 9, the system may be arranged to use a set of five numbers within the 10-digit number to determine the order of the input elements.

In addition to generating phantom passwords, the system of the present invention may generate phantom email addresses for use in conjunction with a phantom password.

Figure 4A:
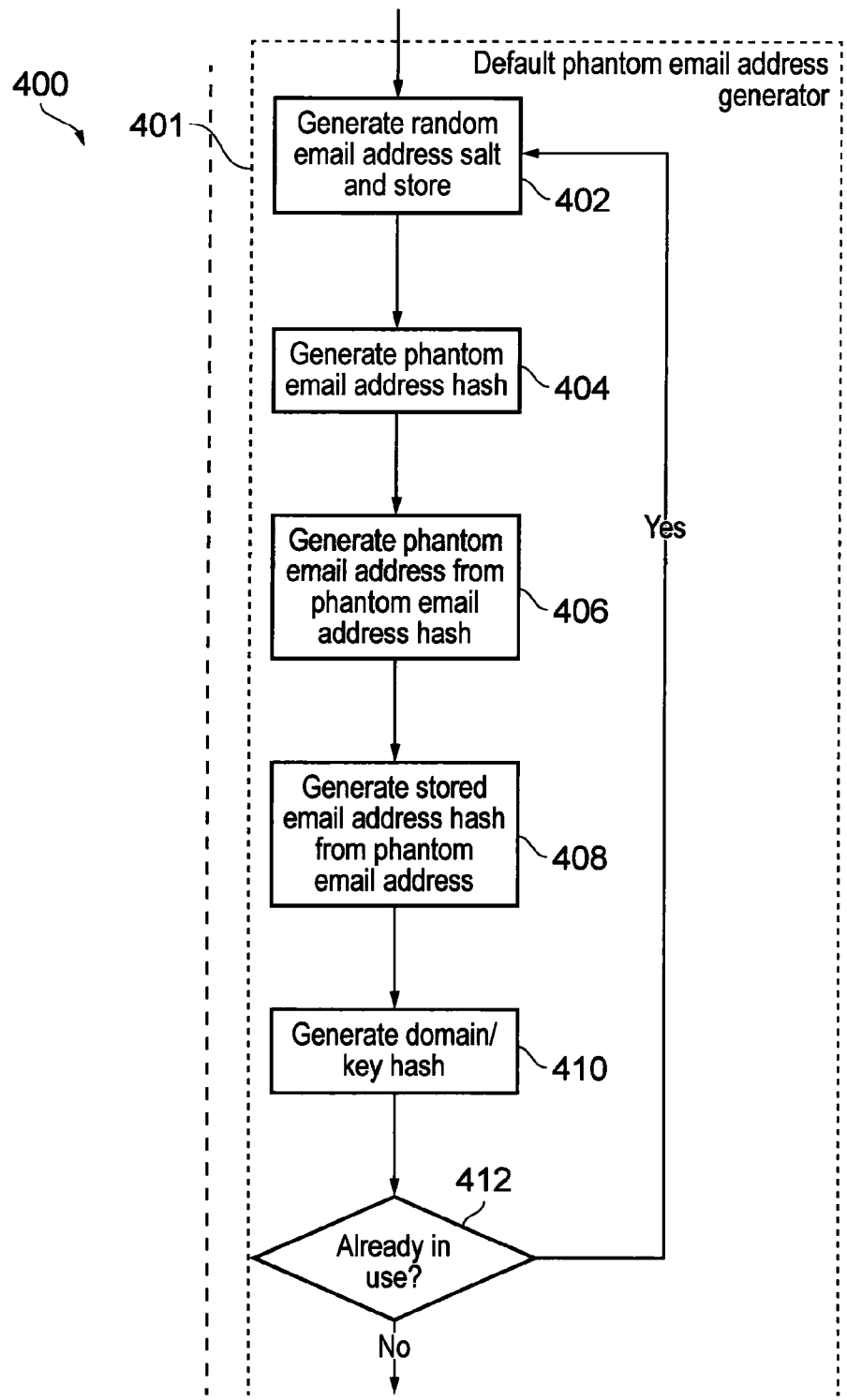
FIGS. 4A and 4B shows a flow chart for an email address generation process in a system that is an embodiment of the invention.
Figure 4B:
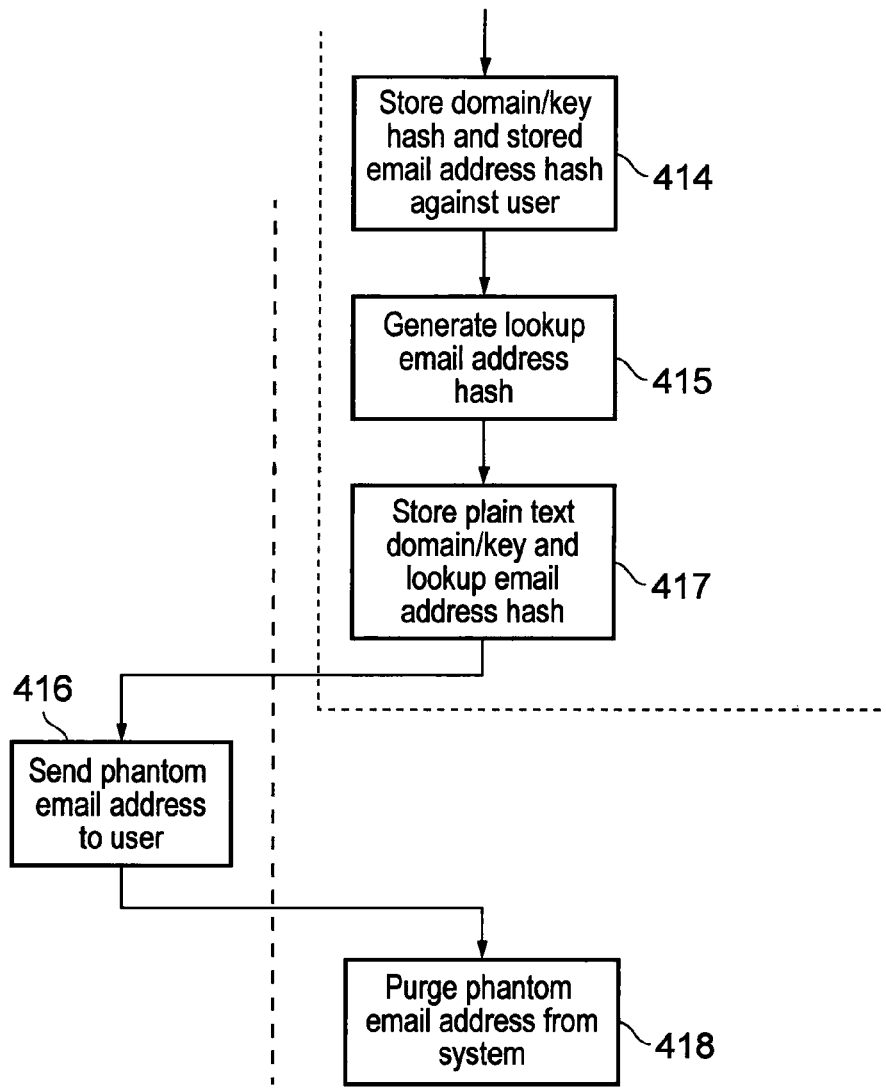

FIGS. 4A and 4B shows a flow chart of a process 400 for generating a phantom email address. The process begins the user logging in to the system, requesting a phantom email address for a given web domain, and, optionally, successfully performing a dual factor authentication process 306 as shown in FIG. 3A. This then triggers a phantom email address generation process 401, which begins with a step 402 of generating a random email address salt, which is stored in the system database in association with the user.

The process continues with a step 404 of generating a phantom email address hash, which is subsequently used to generate the phantom email address. The phantom email address hash is generated in a similar way to the phantom password hash discussed above except for one important difference. The phantom email address hash cannot use the session user password hash as one of its input elements, since this would then not allow the user to reset phantom passwords on other websites.

This can be understood by imagining a forgotten system password scenario. The system password can be reset, but doing so will mean that the session user password hash will be different, and therefore the system will generate a different password for each website. This means that it will be necessary to reset the password on each website. But this password reset would not be possible if the system also reset the phantom email address for the same websites. Accordingly, the session user password hash is not used to create phantom email address hashes. Instead, the input data string for generating the phantom email address hash may consist of the following elements:

1) the username stored for the user in the system database,
2) the stored password salt stored in association with the user,
3) the random email address salt stored for the user at step 402,
4) a machine salt from a file stored on the device (server) that is running the process,
5) an internal salt selected from a list within the source code of the software based on a predetermined digit from the user's randomizer, and
6) the domain/key to identify the system for which the phantom email address is required.

The process for selecting the internal salt may be as described above, although the predetermined digit or character used may be different from that which is used in the generation of the input data string for generating a phantom password hash.

The user's randomizer is also used in this process to determine the order in which the input elements are concatenated to create the input data string. This may be done by using a predetermined selection of characters in the randomizer to determine an order for the input elements. For example, if the randomizer is a 10-digit number corresponding to a random order of the digits 0 to 9, the system may be arranged to use a set of numbers within the 10-digit number to determine the order of the input elements.

Because the process above does not use the session user password hash as an input element, the email address produced for a specific website/domain will be the same regardless of the user's login credentials.

Once the phantom email address hash is generated by applying a hashing algorithm to the input data string discussed above, the process continues with a step 406 of generating the phantom email address itself from the phantom email address hash by using a hash-to-string conversion process. The generated string has a system domain, e.g. phantomkey.net appended to it to create the full phantom email address.

The process continues with a step 408 of generating a stored email address hash from the phantom email address for the purposes of preventing duplication within the system, i.e. ensuring that the phantom email address is used only for one user and domain/key combination. The hash generator used for this process is arranged to operate without knowledge of the user or web domain. In this case, the hash is created from an input data string that consists of:

1) the generated phantom email address,
2) a machine salt from a file stored on the device (server) that is running the process, and
3) an internal salt selected from a list within the source code of the software based on the first character of the email address.

The order in which the input elements are concatenated into the input data string is fixed in this process.

The stored email address hash is created by applying a hashing algorithm to the input data string described above.

The process continues with a step 410 of generating a domain/key hash. The purpose of the domain/key hash is primarily to create a stored entry in the system database with which incoming emails (i.e. emails addressed to the system domain) can be compared to determine subsequent processing. The domain/key hash can also be used as a means for recording how many phantom passwords or email addresses a user has requested. In one embodiment, a user may be required to pay for phantom passwords beyond an initial threshold number, e.g. five.

It is desirable that the system database does not record information about the domains for which a user has requested a password and/or email address, since this in itself can be commercially valuable information. Similarly, it is undesirable to allow the usage of one user to be linked to the usage of another user. The domain/key hash disguises the domain in a manner that means the domain information cannot be readily extracted from the system database. This is done by incorporating user information into the input data string from which the hash is generated, which in turn means that each hash is user-specific and hence cannot be compared between users.

The input data string for the domain/key hash may consist of:

1) the username stored for the user in the system database,
2) the stored password salt stored for the user,
3) a machine salt from a file stored on the device (server) that is running the process,
4) an internal salt selected from a list within the source code of the software based on a predetermined digit from the user's randomizer, and
5) the domain/key to identify the system.

The process for selecting the internal salt may be as described above, although the predetermined digit or character used may be different from that which is used in the generation of the input data string for generating a phantom password hash.

The user's randomizer is also used in this process to determine the order in which the input elements are concatenated to create the input data string. This may be done by using a predetermined selection of five characters in the randomizer to determine an order for the five input elements. For example, if the randomizer is a 10-digit number corresponding to a random order of the digits 0 to 9, the system may be arranged to use a set of five numbers to determine the order of the input elements.

The domain/key hash is created by applying a hashing algorithm to the input data string described above.

The process then continues with a step 412 of checking that the stored email address hash created at step 408 does not already exist on the system database other than in conjunction with the current user and the domain/key hash created at step 410. If the stored email address hash does exist, a new phantom email address is generated by repeating steps 402-410. If not, the system proceeds as shown in FIG. 4B to step 414 in which the domain/key hash and the stored email address hash are stored against the user.

The process continues with a step 415 of generating a lookup email address hash. This hash is different to the stored phantom email address hash so that there will be no link between the domain/key when stored on the system database in plain text and the user. The lookup email address hash may be generated using a similar input data string to the stored email address hash except that a different character of the email address is used to select the internal salt.

The process then continues with a step 217 of recording the plain text domain against the lookup phantom email address hash. This is done in such a way that there cannot be any link deduced between this record and the user. To this end these records are stored in the DB without any timestamps to avoid the possibility of being able to link it to the user based on time.

The process continues with a step 416 of notifying the user of the phantom email address generated at step 406. This may involve displaying the phantom email address on the user's computer, e.g. in a format suitable for copying and pasting into the relevant fields. If the system operates through a browser plugin, the phantom email address may be populated directly into an email address field on the webpage.

After the phantom email address is provided to the user, the process concludes with a step 418 of purging the phantom email address from the system. Herein, purging means deleting any information representative of the phantom email address from memory and overwriting the relevant area of memory with other information. After this step is complete, there is no record on the phantom email address on the system database.

Figure 5A:
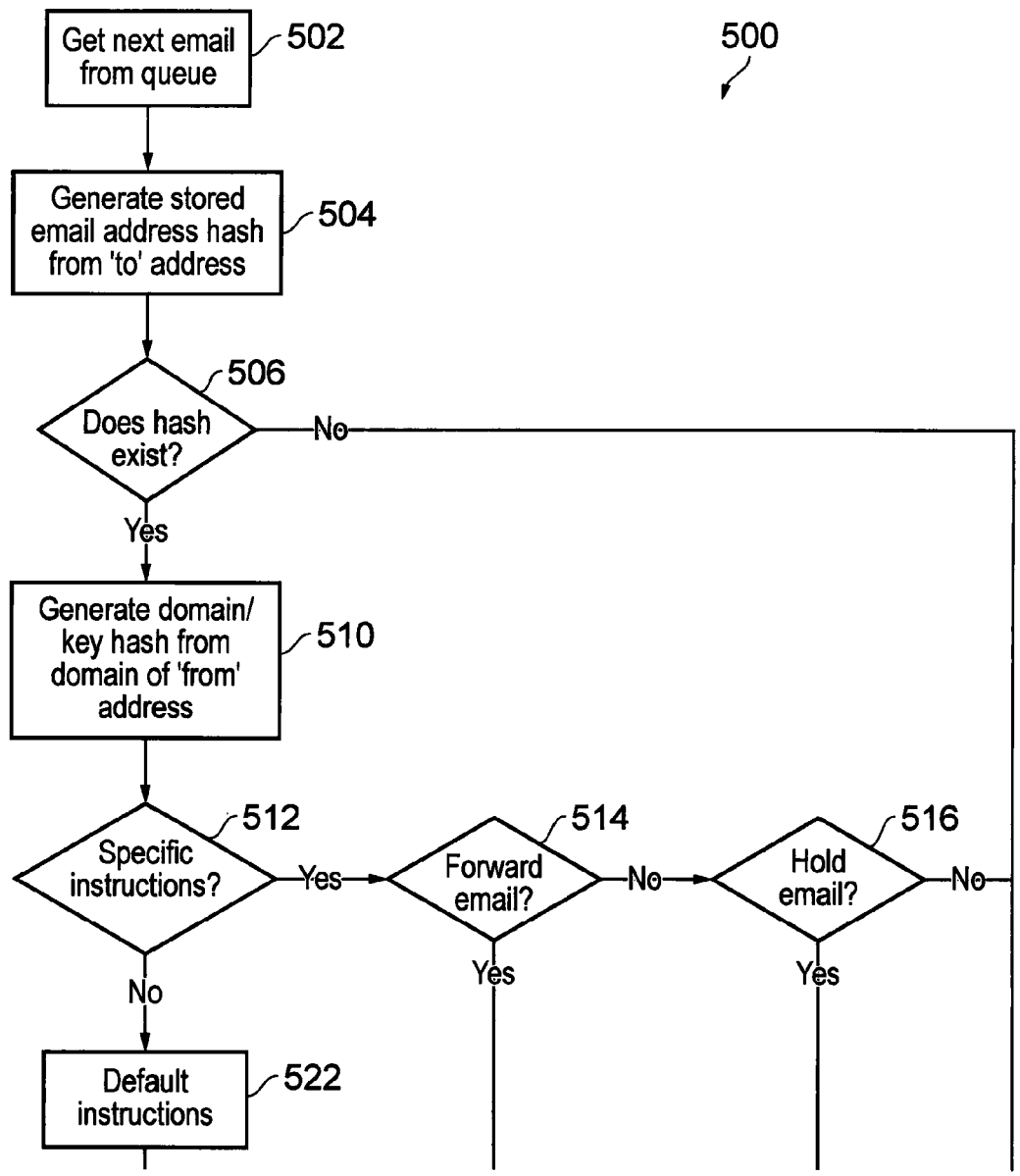
FIGS. 5A and 5B show a flow chart for an email management process in a system that is an embodiment of the invention.
Figure 5B:
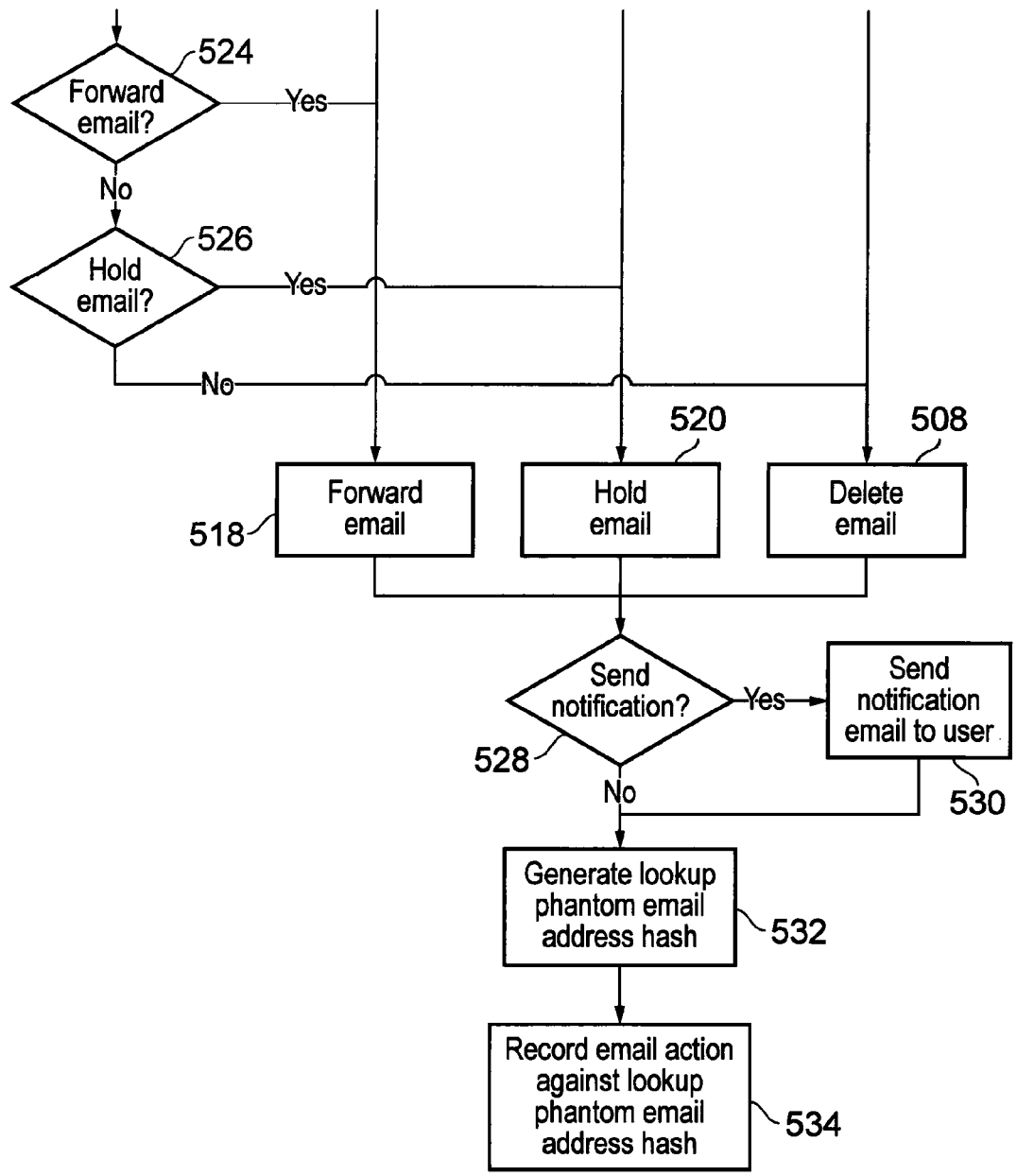

FIGS. 5A and 5B are a flow chart illustrating a process 500 of handling incoming emails that are received at the system domain (e.g. phantomkey.net). For example, the system may provide an SMTP server, e.g. hosted in Microsoft's Azure platform. The incoming emails are placed in a queue, as is conventional. The process 500 begins with a step 502 of taking the next email from the queue, and continues with a step 504 of extracting the "to" email address field from the email and generating an email address hash from it using the same process as discussed above with reference to step 408 of FIG. 4. The process continues with a step 506 of comparing the generated email address hash with the system database to determine whether or not a match exists.

If a match does not exist, the process continues with a step 508 of deleting the email, or otherwise ceasing processing thereof (see FIG. 5B).

If the hash does match an entry in the system database, the process may either simply forward the email to an email address of the user that is linked with the matched email address hash, or it may perform more advanced automated email processing as shown in FIGS. 5A and 5B. The more advanced email processing may include a step 510 of extracting from the received email a domain/key from the "from" email address field and generating a domain/key hash using the steps described above. This may allow a user to set specific instructions for email handling from different domain/keys for which they have generated phantom email address and phantom passwords.

After the domain/key hash is generated at step 510, the process continues with a step 512 or querying the system database to determine whether or not there are specific instructions associated with that domain/key hash. For example, the system may be arranged to perform a step 514 of determining whether or not forward the email. If the user has set forwarding for this specific domain, the process continues with a step 518 of forwarding the email. If not, the process continues with a step 516 of determining whether or not to hold the email. If the user has set holding as the default action for this specific domain, the process continues with a step 520 of holding the email e.g. temporarily in a table in the system database where it may be accessed later by the user. If the user has not set forwarding or holding, the process may continue with a step 508 of deleting the email.

If there are no specific instructions associated with the generated domain/key hash, the process may continue with a step 522 of applying the default instructions for email processing. The user may set their default instructions to one of forwarding, holding and deleting. Thus, upon applying default instructions, the process continues with a step 524 of determining whether or not forward the email. If the user has set forwarding as the default action, the process continues with a step 518 of forwarding the email. If not, the process continues with a step 526 of determining whether or not to hold the email. If the user has set holding as the default action, the process continues with a step 520 of holding the email e.g. temporarily in a table in the system database where it may be accessed later by the user. If the user has not set forwarding or holding as the default action, the process may continue with a step 508 of deleting the email.

Upon performing the relevant action (default or specific), the process may continue with a step 528 of determining whether or not to send an advisory email to the user, e.g. to notify them of the processing. The user may select which actions, if any, are to be notified. If an action is to be notified, the system continues with a step 530 of sending an advisory email.

In order to generate a log of activity, the process continues with a step 532 of generating a lookup phantom email address hash using the process described above. The process then continues with a step 534 of recording the action performed against the lookup email address hash. This is done in a way that means it cannot be linked in any way back to the user. The system simply records that a certain action has taken place at a certain time.

Other methods of email handling may be used. For example, a third party may be used to parse inbound emails and then send the relevant information via an API call to the system of the invention.

Figure 6:
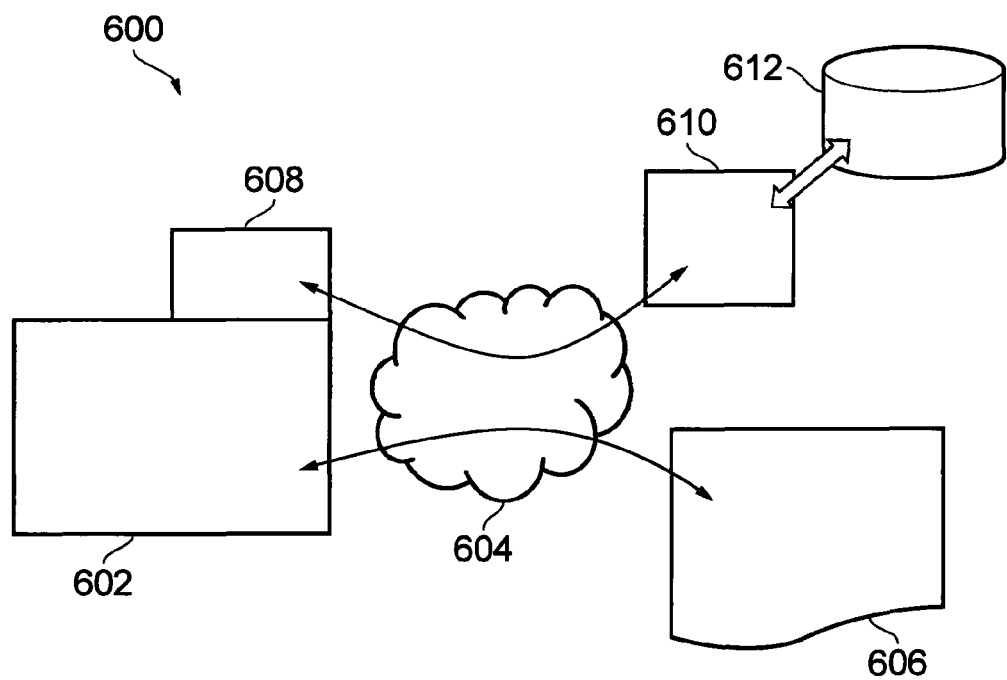
FIG. 6 is a schematic system diagram illustrating an embodiment of the invention implementing using a browser plugin.

The system of the invention may be implemented in a variety of ways. Whilst in principle it may be possible to present the client-facing interface as a webpage to which the user is redirected whenever a username password combination is wanted, it may be particularly convenient to implement the client-facing interface as a web browser plugin or even built directly within a web browser. FIG. 6 shows a schematic system diagram illustrating the plug-in arrangement.

The system 600 shown in FIG. 6 comprises a browser 602 running on a user's computing device (not shown), which is connected over a network 604 to access digital resources, such as websites available on the world wide web (e.g. a service provider's webpage 606) or an off-line digital system requiring a password for access.

The browser 602 may have a plugin 608 running with it, which is in communication over the network 604 with a server 610 running the email address/password management processes discussed above. The server 610 is in communication with the system database 612 that stores the records discussed above.

In use, the user can login to the email address/password management within the browser via the plugin, e.g. using the two factor authentication technique discussed above. When visiting any webpage, the plugin would be able to detect the domain/key from the webpage URL and automatically generate a phantom password and phantom email address if the webpage requires one.

As mentioned above, the plugin may be arranged to automatically prepopulate the username and password fields on the webpage using the information obtained from the server 610. All communication to and from the server 610 is encrypted, e.g. using industry standards such as SSL and HTTPS.

In an alternative implementation, the system may be provided as a standalone (i.e. non-web enabled) version which can be installed in-house, e.g. in a company's data centre. This arrangement may be used to enable internal management of usernames and passwords, which may be particularly useful where multiple logins are required. Since the system purges the phantom passwords, it is likely to be automatically compliant with the relevant PCI security standards.

The invention claimed is:

1. A method of handling emails sent to a phantom email address, the method comprising:
   receiving an email addressed to a complete phantom email address at a processing domain;
   generating an email address reference based on the complete phantom email address;
   searching in a system database for a stored reference that matches the generated email address reference; and
   in response the searching step locating the match of the stored reference to the generated email address reference, performing the further steps of:
      extracting from the received email a domain from which the email was sent; and
      determining subsequent handling of the email using the domain from which the email was sent;
   wherein generating the email address reference comprises:
      concatenating a plurality of email address reference input elements into an email address reference input data string; and
      applying a hashing algorithm to the email address reference input data string to generate a reference email address hash, and
   wherein searching in a system database comprises matching the generated reference email address hash with a stored email address hash stored in the system database.

2. The method of claim 1, wherein the plurality of email address reference input elements comprises:
   the complete phantom email address, and
   an internal salt selected from a list based on a characteristic of the complete phantom email address.

3. The method of claim 1, wherein the system database stores email handling instructions in association with a respective domain, and wherein determining subsequent handling of the email includes searching for email handling instructions stored in association with the domain from which the email was sent.

4. The method of claim 1, wherein:
   the stored email address hash is related to a user,
   the system database is arranged to store a randomizer for that user, and
   the step of determining subsequent handling of the email includes:
      concatenating a plurality of domain/key input elements into a domain/key input data string;
      applying a hashing algorithm to the domain/key input data string to generate a reference domain/key hash, wherein the plurality of domain/key input elements comprises:
         the complete phantom email address;
         the domain from which the email was sent; and
         an internal salt selected from a list based on a predetermined character of the user's randomizer; and
      matching the generated reference domain/key hash to a stored domain/key hash stored on the system database,
   wherein email handling instructions are associated with each stored domain/key hash on the system database.

5. The method of claim 3, wherein the email handling instructions comprise any one of forwarding, holding and deleting the email.

6. The method of claim 1, wherein the step of determining subsequent handling of the email comprises determining, using the domain from which the email was sent, whether to send a notification to a user.

7. The method of claim 1, wherein the step of determining subsequent handling of the email includes generating a respective reference from each of the complete phantom email address and the domain from which the email was sent.

* * * * *